No. 640,516. Patented Jan. 2, 1900.
M. I. PUPIN.
ELECTRICAL TRANSMISSION BY RESONANCE CIRCUITS.
(Application filed May 28, 1895. Renewed Oct. 14, 1896.)
(No Model.)
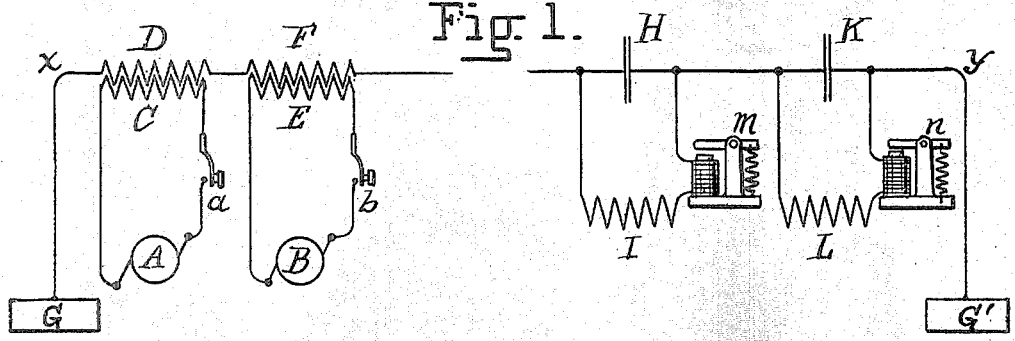
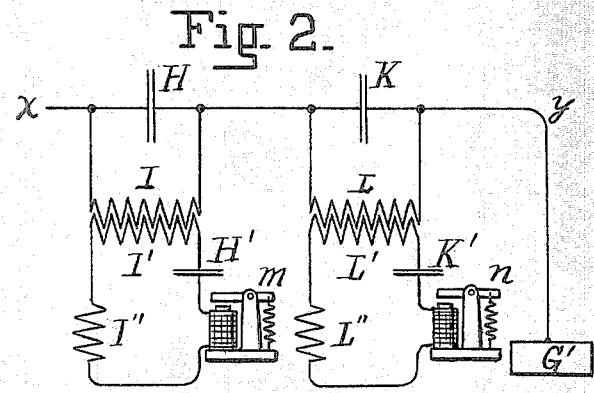
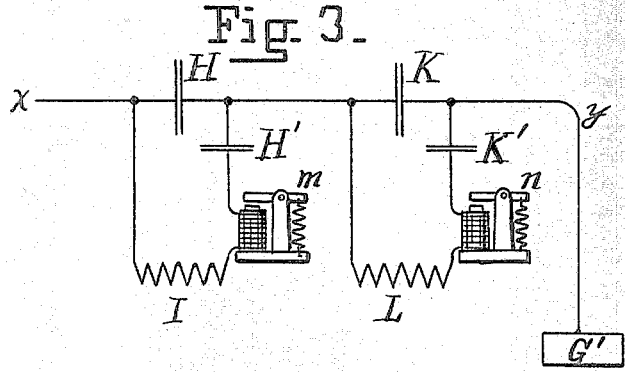
Witnesses:
Samuel W. Balch
Anson Baldwin
Inventor,
Michael I. Pupin,
by Thomas Ewing, Jr.,
Attorney.

UNITED STATES PATENT OFFICE.

MICHAEL I. PUPIN, OF NEW YORK, N. Y.

ELECTRICAL TRANSMISSION BY RESONANCE-CIRCUITS.

SPECIFICATION forming part of Letters Patent No. 640,516, dated January 2, 1900.

Application filed May 28, 1895. Renewed October 14, 1896. Serial No. 608,890. (No model.)

*To all whom it may concern:*

Be it known that I, MICHAEL I. PUPIN, a citizen of the United States of America, residing in the city, county, and State of New York, have invented certain new and useful Improvements in Electrical Transmission by Resonance-Circuits, of which the following is a specification.

If a condenser be inserted in a line and a self-induction coil be connected in shunt with this condenser, then an alternating current impressed upon the line will under certain conditions be greater in the shunt-circuit than in the line itself. The shunt-circuit in this case may be considered as a step-up transformer of the line-current. This subject has been discussed at considerable length in Vol. I of Fleming's treatise on the alternate-current transformer and also in Blakesley's book on alternating currents. There have been, however, no experimental data to guide one in determining the exact limitations within which the results of pure theory are applicable. Such limitations exist, and unless they are clearly understood this method of step-up transformation indicated by the theory fails completely. I have studied experimentally this method of step-up current transformation and have discovered the necessary and sufficient conditions under which such a shunt-circuit is resonant. These conditions may be stated briefly, as follows:

First. The capacity of the condenser and the self-induction of the shunt-coil must be so related as to bring the shunt-circuit in resonance with the line-current.

Second. The shunt-coil should either contain no iron at all, or if it contains iron the quantity of it should be very small, and it should be well laminated and should not form a closed magnetic circuit. This is true of resonance-circuits of every form, it being a general principle and not one limited to shunt-circuits that the use of iron should be avoided in such circuits.

Third. The ohmic resistance of the shunt-circuit should be as small as possible and certainly smaller than the resistance of the line.

By employing a well-constructed condenser and a low-resistance self-induction coil without iron I have succeeded in obtaining from a given line-current a resonant current that is twenty times as large as the line-current. I believe that I am the first to investigate experimentally the behavior of such resonant shunt-circuits and to discover the conditions under which they will operate in a manner indicated by the theory. At any rate I consider myself to be the first to apply such circuits to the solution of the practical problem solved by the following invention.

In multiple telegraphy by resonance-circuit it is necessary to employ selective circuits at the receiving end of the line. The employment of resonance shunt-circuits for selective receiving-circuits offers many important advantages.

By a "resonance-circuit" is meant one which has self-induction and capacity and therefore a natural period. When the self-induction and capacity are properly adjusted so as to give it the period of the impressed electromotive force, the resonance-circuit becomes resonant to this electromotive force.

The arrangement of resonance shunt-circuits herein shown gives less self-induction at the receiving end of the line than any other form of resonance-circuit. They are also under all circumstances step-up transformers of the line-current and are less apt when rendered resonant to interfere with each other than resonance-circuits of any other form.

In the accompanying drawings, which form a part of this specification, Figure 1 is a diagrammatic view of the transmitter and receiver stations, the line-wire being broken away. Fig. 2 is a diagrammatic view of the receiver-station in a somewhat-modified system. Fig. 3 is another diagrammatic view of the receiver-station in another modified system.

Referring now more particularly to Fig. 1, $x\,y$ is a telegraph-line grounded at its ends G and G'. At the sending end of the line two alternators A and B impress in the line $x\,y$ by means of the coils C D and E F two electromotive forces of different frequencies, say of one hundred and fifty and two hundred and fifty vibrations per second, respectively. The keys $a$ and $b$ serve to open and close the inducing alternator-circuits, and thus impart to the line alternating-current waves.

With a long line, such as is usually employed in telegraph systems of the general type here described, the two circuits A a C and B b E are practically independent of each other. They may be varied in arrangement and still retain essential independence. Two circuits forming parts of a system of electric conductors are independent of each other when the energy generated in one by the action of an electromotive force acting in the other is small in comparison with the energy generated in the whole system by the action of this same electromotive force. In order to secure this mutual independence in the transmitter-circuits, it is important that they should act upon the main line through elements which, like the coils D and F, are connected in the main line in series. In practice it is found advantageous to throw the currents onto the line at the transmitting end through transformers. And in case of lines that are short in comparison with the wave length of the current transmitted the selectivity of the receiving resonance-circuits is more pronounced and independent of what is going on at the transmitting end of the line when the secondary coils of the transformers at the transmitting end are all placed in series in the line than when they are placed in multiple. At the receiving end it is important to have condensers with shunts around them containing self-induction coils forming parts of the main line. It is obvious that the coils I and L are just as much in series in the main line as are the condensers H and K.

By the term "transmitter-circuits" I do not mean to designate transmitter branches connected to a line-wire in multiple with each other. Such branches, of course, cannot be independent of each other, since changes in the resistance and self-induction of one will appreciably affect the others.

At the receiving end condensers H and K, of adjustable capacity, are inserted in the line in series, and each condenser is shunted by a coil of adjustable self-induction containing no iron. These coils are indicated in Fig. 1 by the letters I and L. The capacity of the condenser H and the self-induction of the coil I being such that the natural period or frequency of the shunt or resonance circuit H I is the same as the period of one of the electromotive forces which produce the current coming over the line—say that having a periodicity of one hundred and fifty per second—this circuit H I will be in resonance with the current and therefore will act selectively with respect to it. In the same manner by adjusting the electromagnetic constants of the resonant shunt-circuit, which contains coil L, this resonance-circuit is made to act selectively with respect to the other current on the line. These resonance receiving-circuits are, like the transmitting-circuits, mutually independent, a current flowing in one generating no appreciable current in another. If, therefore, the periodicity of the electromotive force impressed by circuit A C a be one hundred and fifty and that of B E b be two hundred and fifty, we shall have, whenever the key a closes the circuit A C a, a resonant current of one hundred and fifty periods in the resonant shunt-circuit H I. Similarly when the key b closes the circuit B E b there will be a resonant current of two hundred and fifty periods in the local circuit K L. If both keys are closed simultaneously and therefore both alternators are acting simultaneously upon the line, there will be a resonant current with the frequency of one hundred and fifty in the circuit H I and there will be a resonant current with a frequency of two hundred and fifty in the circuit K L.

It is evident that theoretically any number of resonance shunt-circuits may be employed at the receiving end of the line, each made resonant (by a proper adjustment of its electromagnetic constants) to one of the periodic currents impressed on the line at the transmitting end.

Referring now more particularly to Fig. 2, which represents the receiving end of the line and can be hitched onto the transmitting end shown in Fig. 1 instead of the receiving end shown in that figure, I show a resonance-circuit H I and K L. The condensers H and K, as in Fig. 1, are in series in the line; but I control the frequency of H I by means of a circuit H' I' I'', which contains the secondary coil of the induction-coil I I' and the supplemental condenser H' and a self-induction coil I''. This system is in its practical operation the same as that of Fig. 3. In each the supplemental condenser H' and K' and the self-induction coil affect the constants of the resonant shunt-circuits, and by adjusting one or both the natural periods of the resonant shunt-circuits H I and K L can be adjusted until they equal the desired frequencies; but instead of indirectly affecting the constants of the resonant shunt-circuits by means of the supplemental condensers and induction-coils, as in Fig. 2, I can put the supplemental condensers directly in the resonant shunt-circuits. This is shown in Fig. 3, which, like Fig. 2, represents a modification of the receiving end shown in Fig. 1. The periodicities or frequencies of the induction-circuits H H' I and K K' L can be adjusted by adjusting the capacity of the supplemental condensers H' and K' and the self-induction coils I and L. The forms shown in Figs. 2 and 3 are preferable to the form shown in Fig. 1.

Each resonant shunt-circuit contains an electromagnet m or n, which may be taken as representing generically a translation device operated by the energy of the current which traverses the resonant shunt-circuit. It may be operated by this current either directly or indirectly. It is shown in Fig. 1 as operated directly, since the translating device is included directly in the resonant shunt-circuit.

The disposition of the coils and condensers as shown in Figs. 2 and 3 does not differ in principle from that shown in Fig. 1, yet it should be noted here that my experience shows these dispositions to be more effective under certain conditions than that of Fig. 1. The dispositions give the resonant shunt-circuits a greater selectivity, and therefore I find these preferable in cases where a large number of resonant receiving-circuits are to be employed whose periods are near each other.

I do not claim in this application the method of distributing the electrical energy of periodic currents, which consists in throwing a number of such currents of different frequencies upon a single line and conveying the several energies of these currents each selectively to a separate electrical translating device; nor do I claim herein a system of distribution of electrical energy comprising a main line, means for impressing multiperiodic electromotive forces thereon, branch lines connected with the main line each having its self-induction and capacity so related as to be permeable to alternating currents of a given frequency, and an electrical receiving device in each branch line; nor do I broadly claim any method of or apparatus for distributing electromotive forces of different frequencies, each selectively, to a separate electrical translating device by the proper proportioning of the electromagnetic constants of the parts of the electrical system to be made selective and by which the translating devices are controlled either with or without any method of or arrangement of apparatus for developing upon a main line the electromotive forces of different desired frequencies independently of each other and simultaneously or otherwise, because these broad inventions are claimed substantially in my other application, Serial No. 501,092, filed February 23, 1894, for multiple telegraphy and which application is now involved in interference; nor do I broadly claim the combination, in an electric circuit, of means for imposing upon said circuit one or more electromotive forces of previously-selected periodicities, one or more circuits in inductive relation to said first-named circuit, and means for tuning the said inductively-related circuit or circuits each in resonance with one of said periodic electromotive forces and independently of the rest of the system, with or without additional means for also tuning separate branches connected to the first-named circuit, with which branches the other circuits named are inductively related, these being claimed in my other application for improvements in telegraphy, filed January 28, 1895, Serial No. 536,488, and at the transmitting-stations I prefer to use the arrangement shown and claimed in my other application for improvements in distributing electrical energy, filed May 21, 1895, Serial No. 550,058, renewed December 4, 1899, as Serial No. 739,207.

Where in the claims I specify the combination of a line-wire or a line with one or more resonant circuits without indicating that there are both receiving and transmitting circuits connected by a line-wire, I wish it to be distinctly understood that I do not limit myself to any specific means or method of transmitting from one station to another nor to any specific connection between the transmitting and receiving stations; nor do I intend, except where it is specified in the claims, to indicate definitely the arrangement which should be employed at the transmitting-station or to limit the claims with respect thereto.

It is obvious that many modifications may be made in my arrangement without departing from the spirit of my invention.

Having now fully described my invention, what I claim, and desire to secure by Letters Patent of the United States, is—

1. In an electric system the combination of a main line, mutually-independent exciting-circuits, which act upon the main line through elements placed therein in series, independent means for impressing an electromotive force of desired frequency upon the main line at each exciting-circuit, mutually-independent receiving-circuits, means for tuning each receiving-circuit to resonance with one of the impressed electromotive forces, and translating devices operated by the currents in the receiving-circuits, substantially as described.

2. In an electric system the combination of a main line, mutually-independent exciting-circuits which act upon the main line through elements placed therein in series, independent means for impressing an electromotive force of desired frequency upon the main line at each exciting-circuit, mutually-independent receiving-circuits which are acted upon from the main line through elements connected therein in series, means for tuning each receiving-circuit to resonance with one of the impressed electromotive forces, and translating devices operated by the currents in the receiving-circuits, substantially as described.

3. In an electric system the combination of a main line, mutually-independent exciting-circuits which act upon the main line through transformers the secondary coils of which are placed in the main line in series, independent means for impressing an electromotive force of desired frequency upon the main line at each exciting-circuit, condensers in series in the main line, a shunt around each condenser containing a self-induction coil, thus forming mutually-independent receiving-circuits, means for tuning each receiving-circuit to one of the impressed electromotive forces, and translating devices operated by the currents in the receiving-circuits, substantially as described.

4. In an electrical system, the combination of a line-wire, a condenser therein, a shunt around the condenser containing a self-induction coil without an iron core thus forming a resonance-circuit and means for adjusting the electromagnetic constants of the resonance-circuit so as to give it a desired periodicity, substantially as described.

5. In a multiplex signaling system the combination of line-wire, means for impressing thereon, independently of each other, electromotive forces of two or more distinct periodicities, two or more condensers in series in the line; a shunt around each condenser containing a self-induction coil, each condenser with its shunt-coil forming an independent resonance-circuit, receiving instruments therein, and means for adjusting the electromagnetic constants of these resonance-circuits, so as to give to each such circuit a periodicity corresponding to one of the impressed electromotive forces, substantially as described.

6. In an electrical system, the combination of a line-wire, means for impressing thereon a current of a given frequency, a condenser in the line, a shunt around the condenser containing a self-induction coil without an iron core thus forming a resonance-circuit, and means for adjusting the electromagnetic constants of the resonance-circuit so as to give it a periodicity corresponding with the frequency of the current to be impressed upon the line, substantially as described.

7. In an electrical system, the combination of the line, means for impressing thereon a current produced by two or more electromotive forces of different frequencies which are independent of each other, two or more condensers in the line in series, a shunt around each condenser containing a self-induction coil, thus forming resonance-circuits, circuits in inductive relation thereto and containing condensers and self-induction coils supplemental to those of the resonance-circuits, receiving instruments, and means for adjusting the electromagnetic constants of these resonance-circuits so as to give each such circuit a periodicity corresponding to the frequency of one of the electromotive forces impressed upon the line, substantially as described.

8. In an electrical system, the combination of a line-wire, two or more condensers connected in series therein, a shunt around each condenser containing a self-induction coil, thus forming resonance-circuits, receiving instruments therein, a supplemental condenser in each of the resonance-circuits, and means for adjusting the constants of each resonance-circuit, so as to give it a desired periodicity, substantially as described.

9. In an electrical system, the combination of a line-wire, means for impressing thereon a current produced by two or more electromotive forces of different desired frequencies, two or more condensers in the line in series, a shunt around each condenser containing a self-induction coil, thus forming resonance-circuits, means for adjusting the constants of each resonance-circuit so as to give each a periodicity corresponding to the frequency of one of the electromotive forces, and translating devices each operated by the energy of the current traversing one of the resonance-circuits, substantially as described.

10. A resonance-circuit in which the self-induction coil employed to give the circuit a definite periodicity contains no iron, substantially as described.

Signed in New York this 25th day of May, 1895.

MICHAEL I. PUPIN.

Witnesses:
S. KATHARINE PUPIN,
HY. H. WHITCOMB.